United States Patent Office 3,181,380
Patented May 4, 1965

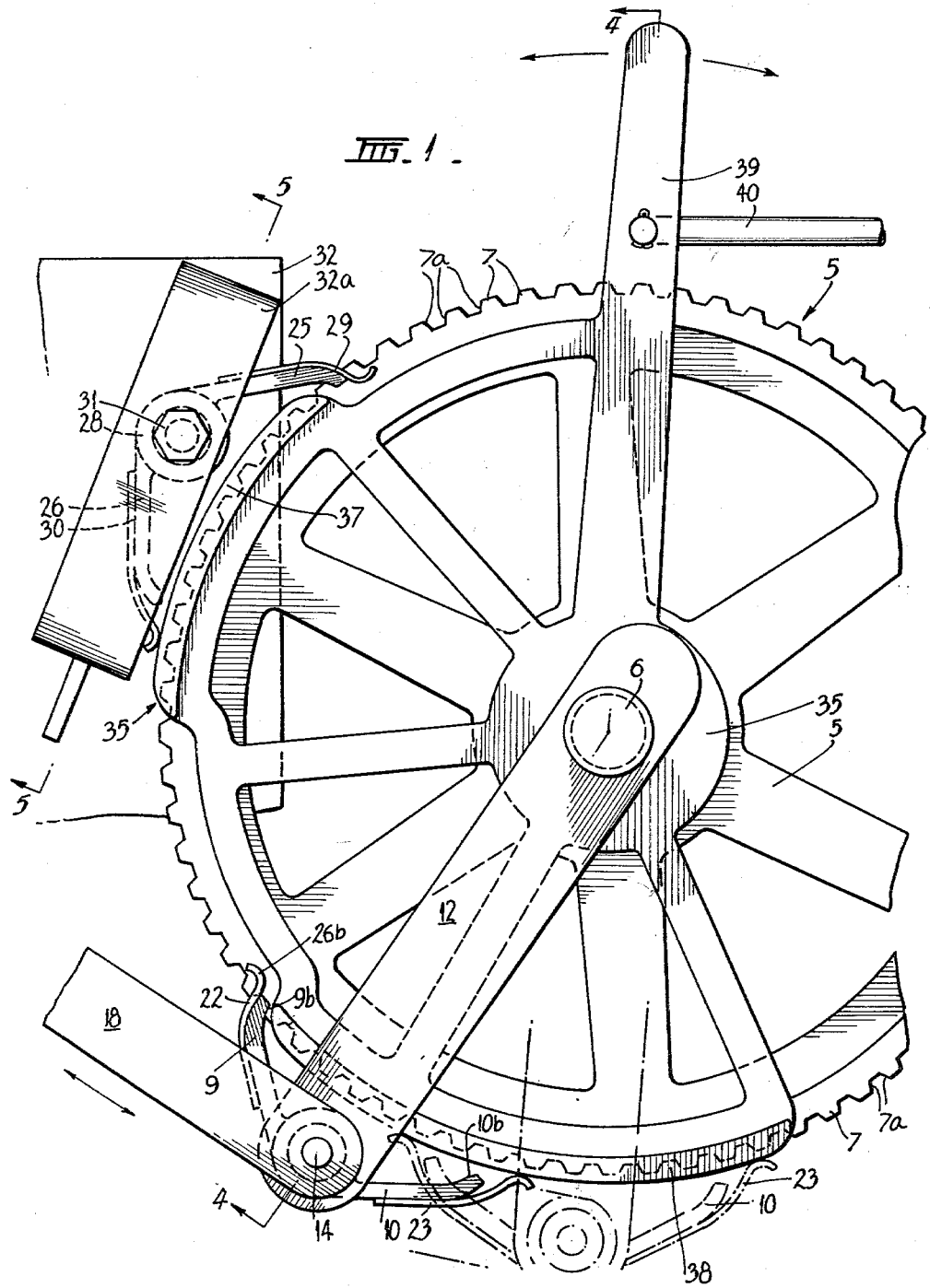

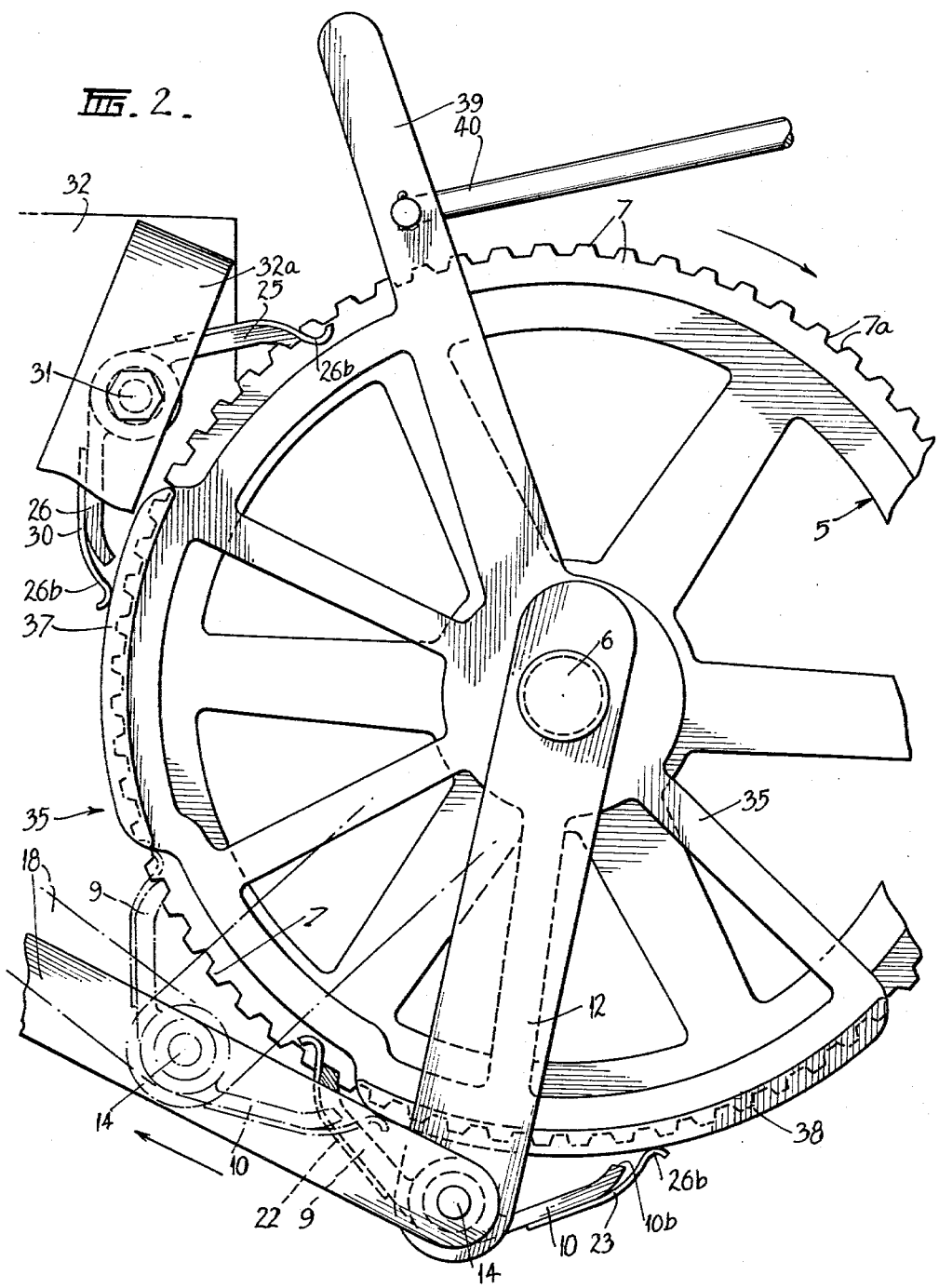

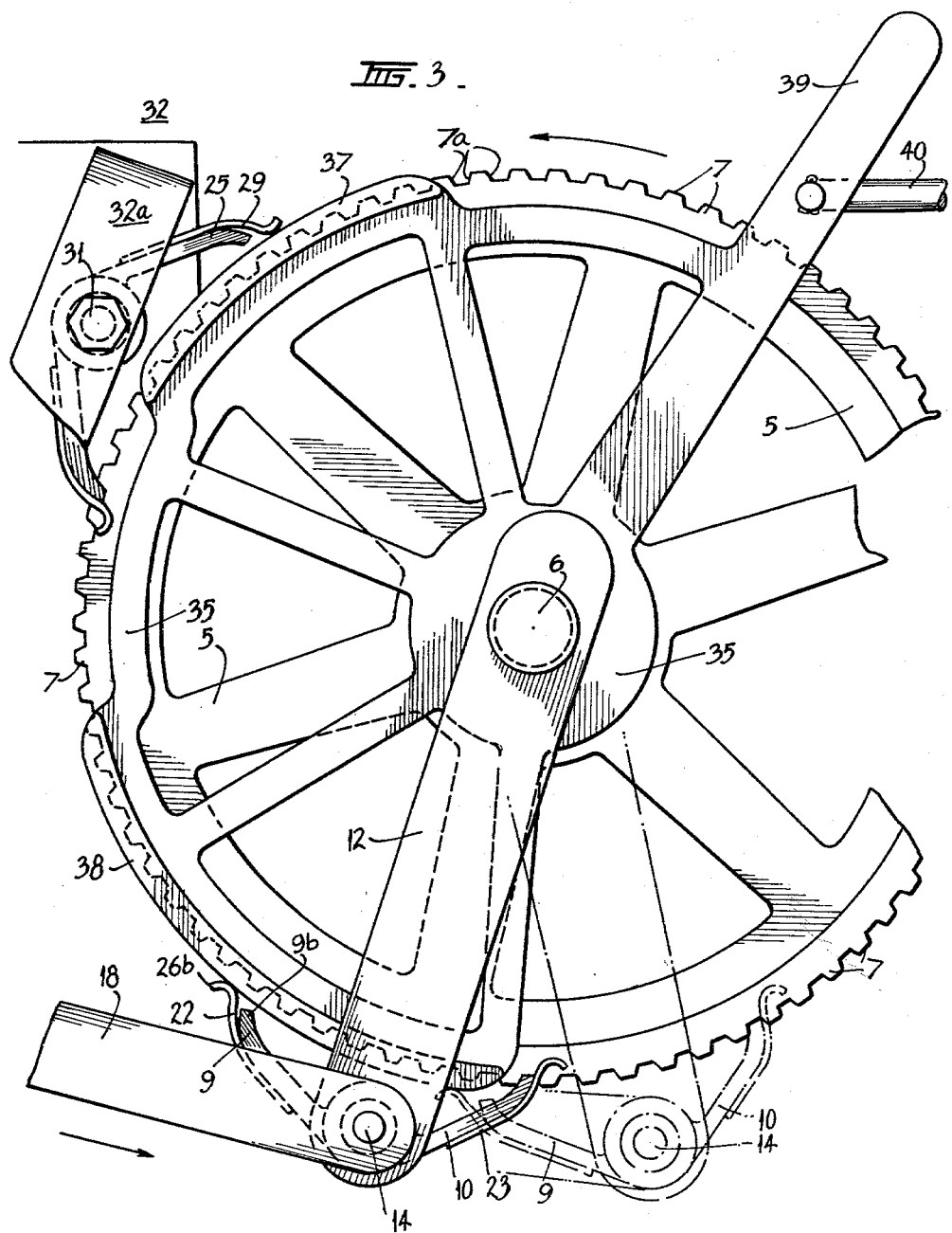

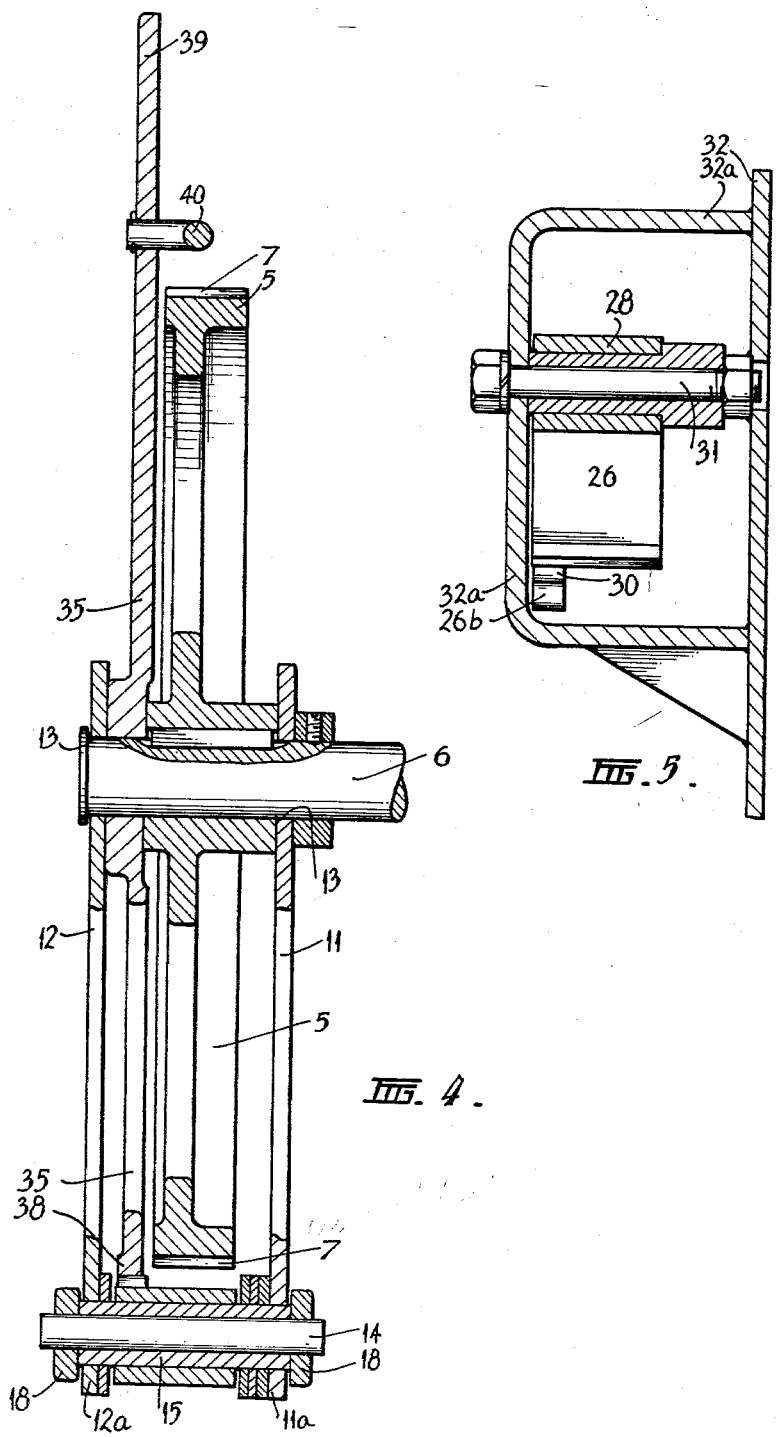

3,181,380
REVERSIBLE RATCHET DRIVES
Josef Pellen, Dandenong, Victoria, and Roy Alis, Clayton, Victoria, Australia, assignors to Sperry Rand Corporation, New York, N.Y.
Filed Feb. 4, 1964, Ser. No. 342,476
2 Claims. (Cl. 74—152)

This invention relates to the type of drive transmission commonly known as a ratchet drive wherein the oscillatory movement of a pawl effects an intermittent unidirectional annular movement or rotation of an associated toothed wheel.

Drive transmissions of this type are known in which the direction of rotation of the wheel may be changed but such change can only be effected after several manual adjustments have been made to the relative arrangement of the components of the drive mechanism, which adjustments are both time consuming and inconvenient in the use of modern machines.

It is therefore the principal object of the present invention to provide a reversible ratchet drive in which the direction of rotation of the driven toothed wheel may be quickly and conveniently reversed at will in a single operation.

It is a further object of the invention to provide such a reversible ratchet drive in which the speed to be developed by the toothed wheel in either direction may be varied at will.

With the above stated principal object in view there is provided according to the present invention a reversible ratchet drive mechanism comprising a tooted wheel mounted for rotation about its axis, a forward and a reverse drive pawl mounted for oscillator movement in unison in the plane of the wheel, and means operable at will to selectively move either one of said pawls into driving engagement as the other pawl moves out of engagement with the toothed wheel according to the required direction of rotation to be imparted in said wheel.

More specifically there is provided according to the invention a reversible ratchet drive mechanism comprising a toothed wheel mounted for rotation upon a shaft, a pair of forward and reverse drive pawls pivotally mounted upon a common axis for oscillatory movement in unison in a plane radial to the axis of the wheel, and means operable at will to move said pawls in unison whereby as the pawl selected is moved into driving engagement with the toothed wheel to impart the required direction of rotation, the other pawl is disengaged from said wheel to assume an idle position.

Conveniently the two pawls are secured to a common boss pivotally connected to or mounted upon a driving member mounted for oscillation about the shaft of the toothed wheel. Each pawl projects inwardly from one side of the boss so as to engage the peripheral teeth on the wheel whereby the pawls are disposed on opposite sides of the radial plane containing the toothed wheel and pivot axes. Individual resilient means urge each pawl into engagement with the teeth of the toothed wheel, a manually operable cam being provided to selectively apply the resilient stress to the respective pawls, whereby the driving pawl is positively held in engagement and the other pawl out of engagement with the teeth of the toothed wheel.

This construction of the ratchet drive enables the direction of the drive to be reversed by the adjustment or setting of the above single cam, and a suitable cam contour and/or curvilinear length enables the period of engagement of either pawl with the toothed wheel to be varied from zero (neutral) to the full length of the stroke of oscillation.

The accompanying drawings depict a practical arrangement of the ratchet drive mechanism according to the present invention.

In these drawings:

FIGURE 1 is a side elevation of the ratchet drive mechanism illustrating with the pawls arranged to drive the toothed wheel in a short effective stroke in the clockwise direction of rotation.

FIGURE 2 is a similar view showing the cam means in another position and the position of the pawls before and after one longer effective clockwise driving stroke of the reciprocal actuating member.

FIGURE 3 is a similar view showing the pawls adjusted to impart a reverse direction of rotation to the toothed wheel.

FIGURE 4 is a section taken along line 4—4 of FIGURE 1.

FIGURE 5 is a section 5—5 on line 5—5 of FIGURE 1.

Referring now to the drawings, the toothed wheel indicated generally at 5 is keyed to the shaft 6 to be driven and has a plurality of teeth 7 of constant pitch around the periphery of said wheel. The teeth 7 have radial faces 7a on the opposite sides so that the toothed wheel may be driven to either direction by either one of the twin pawls 9 and 10.

A pair of pawl carrying arms 11 and 12 are journalled as at 13 on the shaft 6 and disposed on either side of the toothed wheel 5 to project beyond the periphery thereof. A boss 15 is located between and pivotally connected to the outer ends 11a, 12a, of the abovementioned arms 11, 12 for relative angular movement about an axle 14 parallel to the axis of the shaft 6 of the toothed wheel 5. The pair of twin driving pawls 9 and 10 are secured to the boss 15 and project inwardly at each side to individually engage the teeth 7 of the toothed wheel 5 when required on opposite sides of the plane including the axis of the shaft 6 and boss 15, i.e. as viewed in plan the pawls are generally of a somewhat wide V shape with each limb having a terminal tooth engaging shoulder 9b, 10b of opposite driving inclination.

A pitman arm 18 in the form of a yoke mounted upon the axle 14 connects the pawl carrying arms 11, 12 to a rotating crank or other actuating member not shown to effect oscillation of said arms about the axis of the shaft 6 of the toothed wheel 5.

Each driving pawl 9, 10 has upon the outer face a flat spring member 22, 23 attached thereto and arranged to project beyond the end of the pawl in laterally spaced relation to the toothed wheel 5 as viewed in FIGURES 1 and 2.

At a spaced circumferential location a pair of twin holding pawls 25, 26 also arranged in opposite disposition, are secured to a common boss 28 which pawls have a control spring member 29, 30 associated therewith similar to and for the purpose above described with reference to the arrangement of springs and driving pawls 9 and 10 hereinbefore described.

The boss 28 is pivotally mounted upon the pivoted bolt 31 welded to the machine frame 32 between the latter and the front parallel section of the bracket 32a attached to said frame. The holding pawls 25, 26 are engageable with the teeth 7 of the toothed wheel 5 at opposed circumferential points that will not obstruct oscillation of the driving pawls 9 and 10 or the engagement of either of the latter with the toothed wheel 5.

There is mounted upon the shaft 6 of the toothed wheel 5, a coaxial quadrant 35 having circumferentially spaced radial cam rises 37 and 38 symmetrically curved at each end to merge into the quadrant 35. The cam rise 38 is disposed to co-operate with the spring members 22, 23 of the driving pawls 9, 10 and the cam rise 37 co-operates with the spring members 29, 30 of the check pawls 25, 26. The free projecting end 26b of all the pawl control springs is curled or rolled so as to smoothly ride up the cam rises 37, 38 upon contact with the ends of the latter when the control cam is being operated to adjust the position of the pawls.

As viewed in FIGURE 1 the contour of the cam surface of the cam rise 38 of the driving pawls 9, 10 is such that when the spring member 23 associated with the driving pawl 10 is in contact with said cam surface, the driving pawl 10 is retained out of engagement with the teeth 7 of the toothed wheel 5 and thereby idle and a resilient force is applied to the other driving pawl 9 to urge it into engagement with the teeth of the toothed wheel 5.

Simultaneously, holding pawls 25, 26 are controlled by their cam rise 37 as viewed in FIGURE 1 so that when one driving pawl is in engagement with the toothed wheel the coactive holding pawl 25, 26 is also in engagement with the toothed wheel to prevent reverse rotational movement of the latter during the return stroke of the driving pawl 9 so as to maintain the continued clockwise direction of rotation of the toothed wheel.

A manual control is provided to select the position of the cam rises 37, 38 to bring the coactive driving pawl 9 or 10 and holding pawl 25 or 26 into engagement with the toothed wheel 5 to impart the required direction of rotation to said wheel. The curvilinear length of the cam rises 37, 38 is such that in one position, both driving pawls 9, 10 are maintained in a neutral position out of engagement with the toothed wheel 5 during their full oscillatory movement and thus the toothed wheel remains stationary. This is due to both control springs 22, 23 being disposed in contact with the cam rises and similarly the control springs 29, 30 are each disposed in contact with the cam rise 37.

Movement of the cam sections 37, 38 in either direction by turning of the coaxial quadrant 35 from the abovementioned central or neutral position will bring one or the other driving pawl 9, 10 into engagement with the toothed wheel 5 as its leading control springs 23 or 22 moves off the cam rise whilst the coactive check pawl performs the same action to effect driving of the toothed wheel in one direction. The degree of angular movement of the cam rises upon the shaft 6 determines the particular proportion of the oscillatory movement that the driving pawl is retained in engagement with the toothed wheel and the greater the proportion the faster the speed of rotation of the toothed wheel.

The cam quadrant 35 is turned by the link 40 pivotally connected to the radial extension 39 of said quadrant and fitted with some form of handle not shown.

We claim:

1. A reversible ratchet drive mechanism comprising a toothed wheel mounted for rotation about its axis, a cam quadrant mounted for oscillation about said wheel axis and having a cam rise, an arm mounted for oscillation about said wheel axis, a first driving pawl journalled on said arm and engageable with said toothed wheel to drive said wheel in one direction upon oscillation of said arm, a second driving pawl journalled on said arm and engageable with said toothed wheel to drive said wheel in the opposite direction upon oscillation of said arm, a first spring carried by said first pawl and having a portion engageable with said cam rise to hold said first pawl out of engagement with said toothed wheel, a second spring carried by said second pawl and having a portion engageable with said cam rise to hold said second pawl out of engagement with said toothed wheel, means connected to said arm to oscillate the arm about said wheel axis, and means connected to said cam quadrant for selectively moving said cam rise into and out of engagement with said first and second springs to selectively control engagement of said pawls with said toothed wheel.

2. A reversible ratchet drive mechanism comprising a shaft, a toothed wheel mounted on said shaft for rotation in a predetermined plane, a cam member journalled on said shaft for oscillation about the axis of the shaft in a plane parallel to and displaced axially from said predetermined plane, said cam member having a plurality of cam rises extending radially outwardly from said shaft beyond the periphery of said toothed wheel, an arm having one end journalled on said shaft, said arm extending radially outwardly from said shaft beyond said cam rises, means connected to said arm to oscillate the arm about said shaft, a first pawl member journalled on said arm radially outwardly beyond the periphery of said toothed wheel and having a portion thereof lying in said predetermined plane and engageable with the periphery of said toothed wheel to drive said wheel in one direction upon oscillation of said arm, a second pawl member journalled on said arm radially outwardly beyond the periphery of said toothed wheel and having a portion thereof lying in said predetermined plane and engageable with the periphery of said toothed wheel to drive said wheel in the direction opposite said one direction upon oscillation of said arm, a first leaf-type spring carried by said first pawl member and having a portion thereof lying in the plane of said cam member and engageable by one of said cam rises to hold said first pawl member out of engagement with the periphery of said toothed wheel, a second leaf-type spring carried by said second pawl member and having a portion thereof lying in the plane of said cam member and engageable by one of said cam rises to hold said second pawl member out of engagement with the periphery of said toothed wheel, a third pawl member journalled in a fixed position radially outwardly beyond the periphery of said toothed wheel and having a portion thereof lying in said predetermined plane and engageable with the periphery of said toothed wheel to prevent rotation of said wheel in said one direction, a fourth pawl member journalled in a fixed position radially outwardly beyond the periphery of said toothed wheel and having a portion thereof lying in said predetermined plane and engageable with the periphery of said toothed wheel to prevent rotation of said wheel in said direction opposite said one direction, a third leaf-type spring carried by said third pawl member and having a portion thereof lying in the plane of said cam member and engageable by one of said cam rises to hold said third pawl member out of engagement with the periphery of said toothed wheel, a fourth leaf-type spring carried by said fourth pawl member and having a portion thereof lying in the plane of said cam member and engageable by one of said cam rises to hold said fourth pawl member out of engagement with the periphery of said toothed wheel, said first and second pawl members and said third and fourth pawl members respectively being rigidly interconnected whereby the urging of one of said pawl members out of engagement with said wheel by the spring carried thereby urges the other pawl member rigidly connected thereto into engagement with said wheel, and means to oscillate said cam member about said shaft between a first selective position wherein said cam rises hold all said pawls out of engagement with said wheel simultaneously and a second selective position wherein said cam rises hold only said first and fourth pawls out of engagement with said wheel and a third selective position wherein said cam rises hold only said second and third pawls out of engagement with said wheel.

References Cited by the Examiner
UNITED STATES PATENTS

| 2,769,641 | 11/56 | Brown | 74—157 X |
| 2,797,795 | 7/57 | West | 74—157 X |
| 3,020,774 | 2/62 | Kullmann | 74—157 X |
| 3,107,544 | 10/63 | Nichols | 74—157 |
| 3,120,131 | 2/64 | Simonds | 74—157 |

BROUGHTON G. DURHAM, Primary Examiner.